Dec. 26, 1950     C. H. ANDERSON     2,535,476
MATERIAL HANDLING APPARATUS

Filed March 7, 1947     3 Sheets-Sheet 1

INVENTOR
CLIFFORD H. ANDERSON
BY
ATTORNEYS

Dec. 26, 1950  C. H. ANDERSON  2,535,476
MATERIAL HANDLING APPARATUS
Filed March 7, 1947  3 Sheets-Sheet 2

INVENTOR
CLIFFORD H. ANDERSON
BY Caswell & Lagaard
ATTORNEYS

Dec. 26, 1950     C. H. ANDERSON     2,535,476
MATERIAL HANDLING APPARATUS

Filed March 7, 1947     3 Sheets—Sheet 3

INVENTOR
CLIFFORD H. ANDERSON
BY *Caswell & Lagaard*
ATTORNEYS

Patented Dec. 26, 1950

2,535,476

UNITED STATES PATENT OFFICE 2,535,476

MATERIAL HANDLING APPARATUS

Clifford H. Anderson, Minneapolis, Minn.

Application March 7, 1947, Serial No. 733,006

5 Claims. (Cl. 214—1.1)

My invention relates to material handling apparatus and has for an object to provide an apparatus by means of which the contents of containers may be easily and conveniently removed therefrom.

Another object of the invention resides in providing apparatus by means of which a container having an opening at the top may be elevated and inverted to discharge the contents therefrom by gravity.

An object of the invention resides in providing apparatus by means of which the contents of the container may be uniformly discharged therefrom at any desired rate within certain limits.

A still further object of the invention resides in providing a support and a cradle pivoted to said support and on which the container is mounted.

An object of the invention resides in providing valve means adapted to close the opening in the container and by means of which the flow of the material from the container may be controlled. Another object of the invention resides in disposing the pivot means for the cradle at such a locality that when the cradle is in one position, a part of the same is at floor level so that the container may be mounted thereon without lifting the same.

A still further object of the invention resides in disposing said pivot means with relation to the cradle at such locality that when the cradle is swung in a manner to invert the container the opening in the same will be above floor level.

A feature of the invention resides in providing a housing having an opening therein and into which the container is moved when brought into discharge position, said cradle providing a closure for a portion of the opening in said housing.

An object of the invention resides in constructing said support in the form of a hollow base and in providing a hopper extending into said base and receiving the material discharged from the container.

Another object of the invention resides in providing a conveyer connected with said hopper for removing the material deposited therein.

A still further object of the invention resides in providing the valve means for controlling the discharge of the material from the container with a hood adapted to overlie the opening in the container and to prevent discharge of the material within the container during inversion thereof.

Other objects of the invention reside in the novel combination and arrangement of parts and in the details of construction hereinafter illustrated and/or described.

Figure 1:
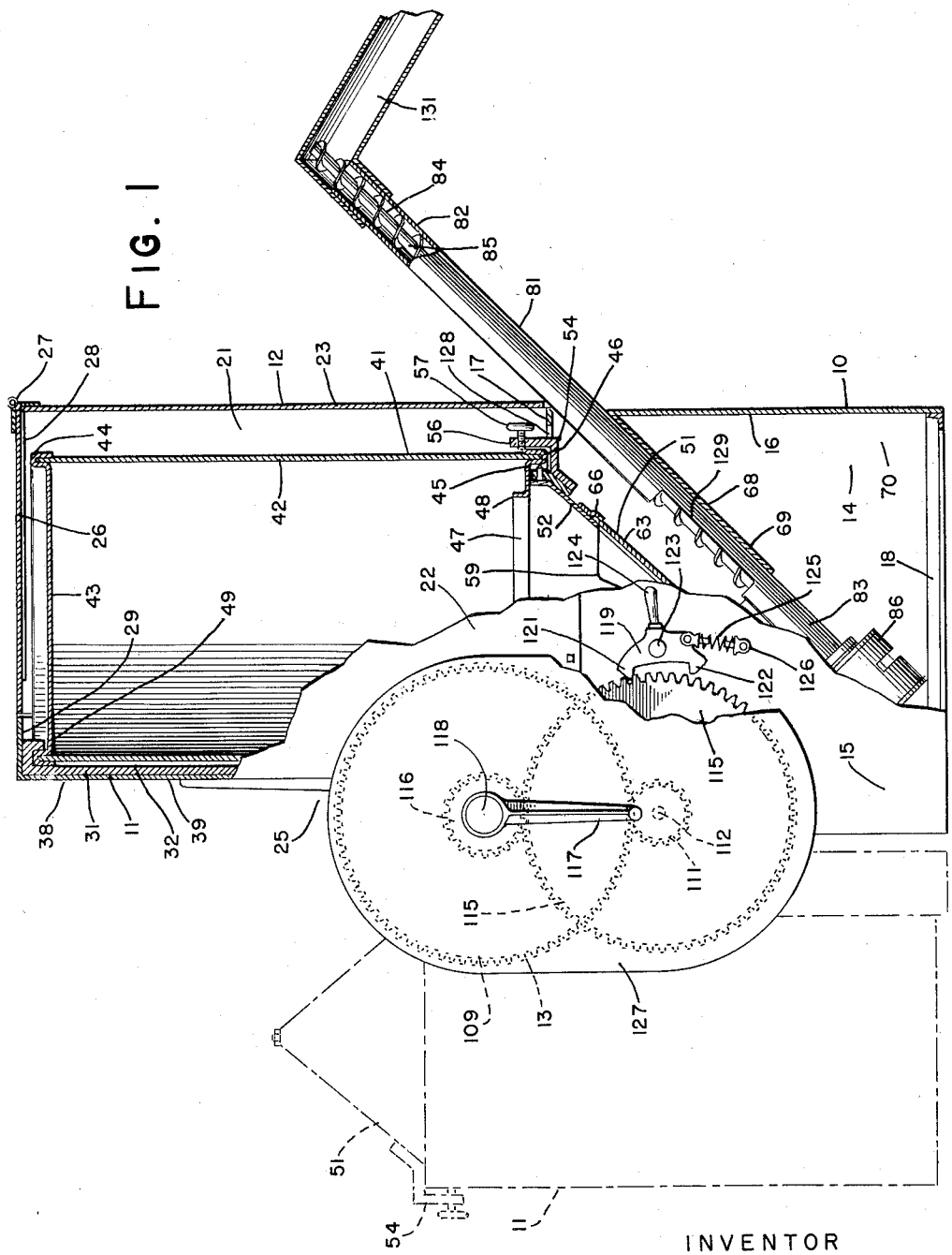
Fig. 1 is a side elevational view of a material handling apparatus illustrating an embodiment of my invention and showing the apparatus partly in section.

In the handling of certain materials and particularly chemicals of a hazardous nature, considerable danger is involved, when the material is manually scooped out of the container and deposited at the locality where the same is to be used. Where caustic soda and similar chemicals are employed the user frequently is burned and dust from the chemical causes coughing and considerable discomfort. The instant invention provides an apparatus by means of which the chemical or other material contained in a container such as a drum may be discharged therefrom without the necessity of the operator breathing the dust or fumes from the chemical or material or having the same come in contact with his person, and whereby any amount of the material may be deposited wherever the same is to be used.

My invention proper consists of a base 10, a cradle 11 and a housing 12. The base 10 forms a support for the cradle 11 and the housing 12. In addition thereto a transmission 13 is employed by means of which the cradle 11 may be moved from a position in which a container may be applied thereto to a position bringing the container into the housing and from which position the material contained within the container may be discharged therefrom. These various parts will now be described in detail.

The base 10 is preferably constructed of sheet metal and consists of side walls 14 and 15, a rear wall 16, and a front wall 19. These walls have secured to the upper ends of the same a top 17 and the lower ends of said walls have attached to them an angular frame 18 which stiffens and reinforces the base and forms a foot adapted to rest on the floor on which the apparatus is to be disposed. Certain of these various parts are preferably formed integral and others welded together or the same may be secured to one another in any well known manner.

Figure 2:
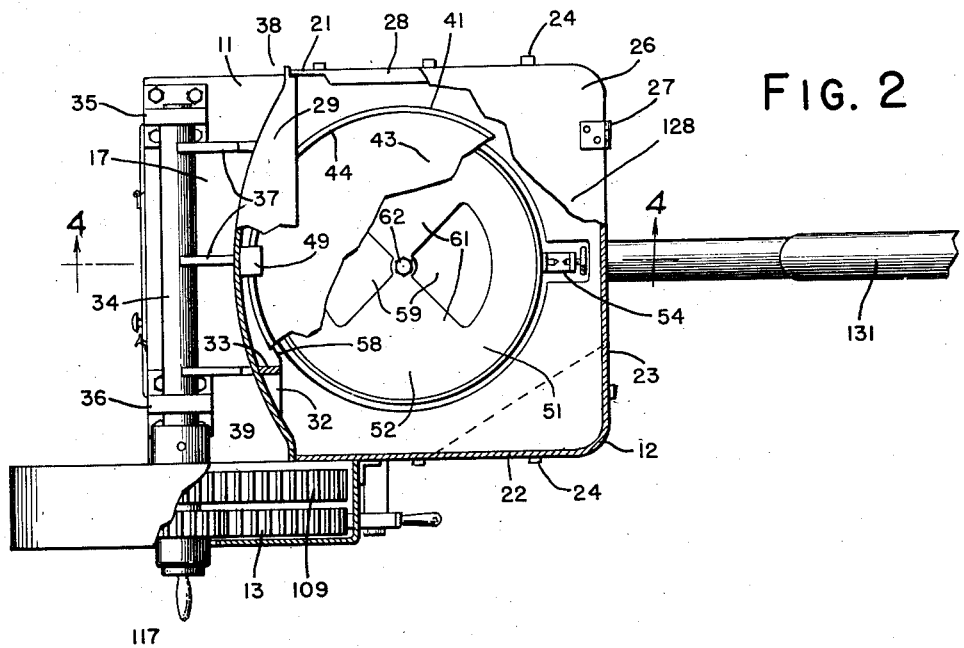
Fig. 2 is a plan view of the structure shown in Fig. 1 and illustrating certain parts of the same broken away.

The housing 12 as best shown in Fig. 2 consists of side walls 21 and 22 and a back 23 disposed therebetween. These parts are preferably formed from a single sheet of material bent at the corners and are of such dimensions as to overlie the walls 14, 15, and 16 of the base 10. The housing 12 is attached to the base 10 by means of bolts 24 which extend through the walls of said housing at the lower ends of the same and through the walls 14, 15, and 16 of the base 10 at localities near the top 17. The walls 21 and 22 fall short of the forward ends of the walls 14 and 15 to provide an angular space 25 between the housing 12 and the base 10 and in which certain portions of the invention are disposed. The upper end and the forward portion of the housing are formed with an opening which is partially closed by means of a cover 26 which is hingedly connected to the rear wall 23 of said housing by means of hinges 27. This closure is adapted to rest on inturned flanges 28 formed on the upper ends of the walls 21 and 22 of the said housing.

The cradle 11 consists of an elongated member 31 preferably constructed as a casting and which has welded to it a number of cleats 32. These cleats are arcuate in form and have welded to them a closure 39 which is constructed of sheet metal and which is also arcuate in form and which is adapted to form a closure for the forward portion of the housing 12 when the cradle is in the position shown in Fig. 2. The closure 39 has welded to it a number of longitudinally extending ribs 33 together with the cleats 32 whereby a rigid and substantial construction is provided.

The cradle 11 is supported by a shaft 34. This shaft is rotatably mounted in bearings 35 and 36 which are attached to the portion of the top 17 disposed in the space 25. Posts 30 are disposed below the bearings 35 and 36 and are secured to the front wall 19 of the base 10 by means of bolts 114. Shaft 34 has welded to it three braces 37 which in turn are welded to the outer surface of the closure 39. By means of this construction the cradle 11 is carried by the shaft 34 and may be turned upon rotation of the said shaft. The bearings 35 are so located with reference to the base 10 so that the upper end 38 of the cradle may be brought down to floor level when the cradle is in the position shown in dotted lines in Fig. 4. The shaft 34 is attached to the cradle 11 at a locality intermediate the center of the container mounted thereon and the top of the container thereby causing the top of the container when the same is inverted in the position shown in full lines in Figs. 2 and 4 to be disposed above the top 17 and base 10.

Figure 4:
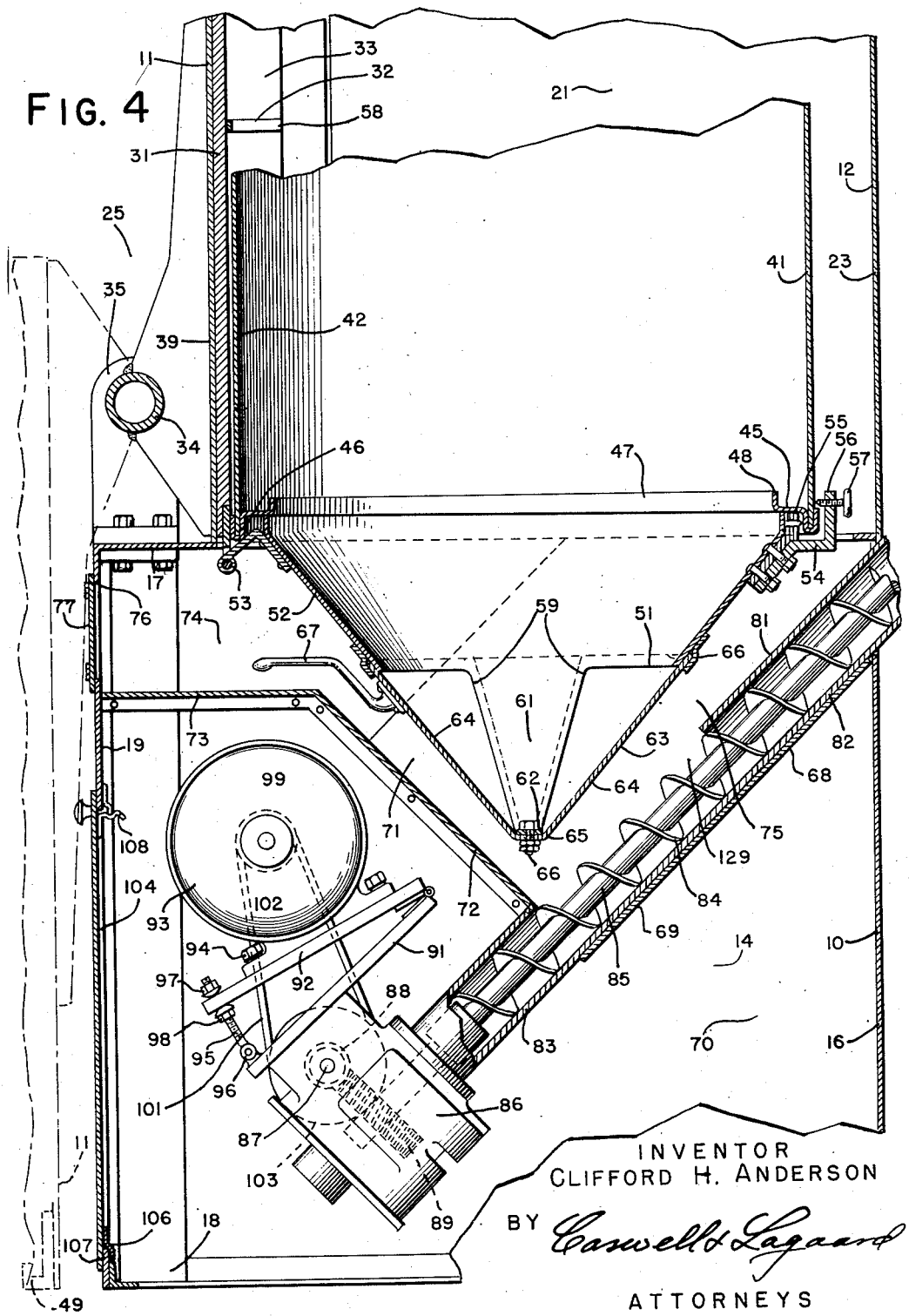
Fig. 4 is an elevational sectional view taken on line 4—4 of Fig. 2 and drawn to a greater scale.

The apparatus of my invention is designed particularly for use in conjunction with a container such as a drum 41 best illustrated in Figs. 1 and 4 of the drawings. This container has a cylindrical wall 42 and a bottom 43 secured thereto. The bottom 43 is recessed to form a rim 44 extending about the wall 42. The upper end of the container 41 has an annular member 45 extending about the same which is crimped over the edge of the wall 42, to form a rim 46 extending about the same. The said annular member has an opening 47 extending through it and by means of which communication with the interior of the container may be had. The said opening is surrounded by a flange 48 which is adapted to receive a cover not shown and by means of which the container may be closed.

The lower end of the elongated member 31 is formed with a hook 49 which is disposed at the lower most portion of the same. This hook is best shown in full lines in Fig. 2 and in the dotted line position of the cradle in Fig. 4. The said hook 49 when the cradle is in its lowermost position is at floor level and is adapted to engage the rim 44 of the container 41. In applying the container to the cradle the same is rolled over toward the cradle and the container raised sufficiently to bring the rim 44 above the said hook. The container may then be lowered and the lower end of the said container becomes supported by the hook 49 and the elongated member 31.

At the upper end of the cradle 11 is provided a valve structure 1 by means of which the discharge of the material from within the container 41 may be controlled. This valve structure includes a hood 52 which is conical in form and which is adapted to rest upon the annular member 45 of the container 41 and to close the same. The said hood has a hinge 53 secured to the same and which is also attached to the upper end of the elongated member 31. The said hood has secured to the opposite marginal portion of the same a clamp 54 which includes a rigid jaw 55 adapted to engage the inner surface of the rim 46 of the container 41. The said clamp further includes a bracket 56 which is threaded to receive a clamp screw 57 which in turn is adapted to engage the cylindrical wall 42 of the container 41 inwardly of the rim 46. When the valve structure 51 is properly applied the opening 47 in the container 41 is closed and the said valve structure becomes rigidly attached to the container. The said valve structure also serves to attach the upper end of the container to the cradle 11. The cleats 32 have arcuate notches 58 cut in the same which are adapted to engage the outer surface of the wall 42 of the container and which hold the same from lateral movement. It will thus be readily contemplated that when the clamp 54 is attached to the container 41 and the said container engages the hook 49 that the container is rigidly mounted on the cradle.

The hood 52 of the valve structure 51 has two segmental shaped openings 59 in the lower portion of the same which are separated by intervening legs 61. These legs are connected together at their lower ends by means of a cross head 62 which may be formed integral with the said legs or may be welded thereto. The valve structure 51 further includes a valve member 63 which is constructed of sheet metal and which has two conical parts 64 adapted to overlie the outer surface of the hood 12 and to close the openings 59 therein. The said valve member is constructed with a connecting portion 65 which connects the two conical parts 64 together. A bolt 66 extends through the cross head 62 and the connecting portion 65 and supports the valve member 63 for rotation with respect to the hood 52. By means of this construction the valve member 63 may rotate with reference to the hood 52 to open or close the openings 59 in said hood. The upper ends of the conical part 64 of the valve member 63 are guided for rotational movement by a guide 66 attached to the hood 52 at the locality of the upper edges of the openings 59. A handle 67 is attached to the valve member 63 and by means of which the same may be rotated to operate the valve structure.

Within the base 10 is situated a hopper 68.

This hopper consists of a sheet of metal which is bent V-shaped in form having a rounded trough-like portion 69 at its center and two sides 71 flaring outwardly therefrom. The sides 71 meet the walls 14 of the base 10 and are cut off at the upper portions of the same where they meet the top 17, and the rear wall 16 of said base. The hopper 68 further includes a sloping front wall 72 which extends from one wall 71 of the hopper to the other and which at its upper portion reaches the two walls 14 and 15 of the said base. A shelf 73 extends horizontally between the two walls 14 and 15 of the base 10 and is connected to the upper portion of the wall 72. This shelf provides a compartment 74 at the upper portion of the base 10 and which communicates with the interior 75 of the hopper 68. Within the interior of the base 10 and below the hopper 28 and shelf 73 is formed a compartment 70 in which certain portions of the invention are disposed. The handle 67 is disposed in the compartment 74. The compartment 74 is accessible from the exterior through an opening 76 in the wall 19 of base 10 which is normally closed by means of a door 77 hingedly connected to the wall 19, by means of hinges 78. A latch 79 holds the door in closing position. The opening 76 also affords the operator a view of the interior 75 of the hopper 68 when the door 77 is open, as well as allowing him to manipulate the handle 67. In the upper most portion of the top 17 of base 10 is formed an opening 128 which receives the valve structure 51 and allows the same to extend into the interior 75 of the hopper 68.

For the purpose of removing the material discharged into the hopper 68 therefrom a conveyer 81 is employed. This conveyer utilizes a tube 82 which lies in the trough-like portion 69 of hopper 68 and which is welded thereto. The said tube has an inlet opening 129 which communicates with the interior 75 of the hopper 68. A portion 83 of said tube extends beyond the wall 72 of hopper 68 and into the compartment 70 in base 10. The tube 82 extends through the rear wall 16 of base 10 and projects upwardly and outwardly beyond the apparatus for a considerable distance. The tube 82 receives a screw flight 84. This flight is mounted on a shaft 85 which extends below the lower most end of the portion 83 of tube 82 and which enters a transmission contained within a case 86. This transmission case is disposed within compartment 70, and is mounted upon the end 83 of the tube 82 and attached thereto in any desirable manner. This case rotatably supports a counter-shaft 87 journaled in suitable bearings formed in said case. The said counter-shaft carries a worm 88 which meshes with a worm wheel 89 secured to the shaft 85.

The counter-shaft 87 is driven in the following manner. Attached to the case 86 is a bracket 91 which has hingedly connected to it at one end a mounting 92 for an electric motor 93. The motor 93 is controlled by means of a suitable switch 90 attached to the wall 14 of the base 10. The said motor is bolted to a mounting 92 by means of bolts 94. The motor 93 may be moved toward and from the transmission case 86 by means of an adjusting screw 95 which is pivoted to a lug 96 attached to the bracket 91. The screw 95 passes through the mounting 92. Two nuts 97 and 98 engaging the said mounting on opposite sides serve to move the said mounting relative to the case 86, and to adjust the distance between the drive shaft 99 of the motor 93 and the counter-shaft 87. A belt 101 passes over a pulley 102 on the motor shaft 99 and another pulley 103 on the counter-shaft 87. These pulleys may be of the type which vary in diameter upon variation in the spacing of the same whereby a variable speed drive is procured for the conveyer 81.

Access to the motor 93 and the transmission case 86 which are both disposed within compartment 70 may be had through an opening 104 in the front wall 19 of the base 10. This opening is closed by means of a closure 105 which overlies the said wall upon the exterior thereof. Two clips 106 attached to said closure engage the edge 107 of wall 19 at the lowermost portion of the opening 104 and hingedly connect the said closure to the base. A latch 108 holds the upper end of the closure attached to the wall 19.

For the purpose of rotating the shaft 34 the following construction is employed. Attached to said shaft exteriorly of the wall 22 of housing 12 is a spur gear 109. This spur gear meshes with a spur pinion 111 rotatably mounted on a stub shaft 112. The said stub shaft is attached to a casting 113 which is welded to the post 30 nearest wall 15. The pinion 111 has cast integrally with it a spur gear 115 which meshes with a spur pinion 116 rotatably mounted on the extreme end of the shaft 34. This gear has attached to it a crank 117 by means of which the same may be rotated. A cap 118 screwed into the end of the shaft 34 holds the pinion 116 in place thereon.

In order to hold the shaft in adjusted position a pawl 119 is employed which is provided with two teeth 121 and 122 adapted to engage the teeth of the spur gear 115. This pawl is pivoted on a stud 123 secured to the wall 15 of base 10 and is provided with a handle 124 by means of which the same may be manipulated. An over-center spring 125 acts between the pawl 119 and a lug 126 pivoted to the wall 15 and maintains either of the teeth 121 or 122 in operative relationship with reference to the teeth of the gear 115.

The various gears 109, 111, 115, and 116 are protected by means of a guard 127 attached to the walls 22 and 15 of the housing 12 and the base 10, respectively.

Figure 3:
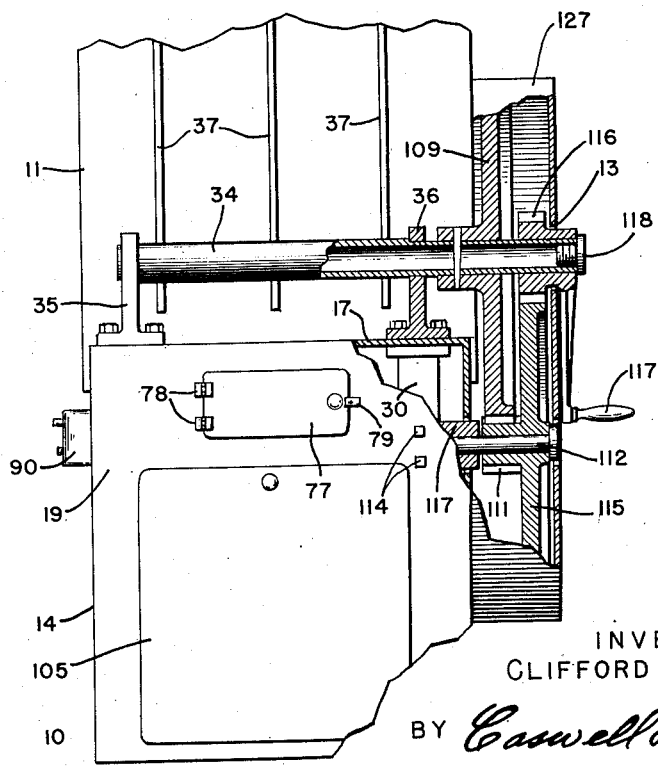
Fig. 3 is a fragmentary front elevational view of the structure shown in Fig. 1 with portions of the transmission mechanism illustrated in section.

The method of using the invention is as follows: The crank 117 is rotated until the cradle occupies the position shown in dotted lines in Fig. 4. The drum whose contents is to be removed therefrom is next rolled over toward the cradle and the far edge of the same raised sufficiently to bring the lip 44 of said drum above the hook 49. The drum or container is then lowered until the said lip is properly engaged by the hook. The cover for the opening 47 of the container is next removed. The valve structure 51 including the hood 52 is next swung about the hinge 53 until the same overlies the upper portion of the container and until said hood rests upon the annular member 45. The container is next moved toward the cradle until the wall 42 engages the notches 58 in the cleats 32. The clamp 54 is next applied and the screw 57 tightened which clamps the upper end of the wall 42 of the said container at the locality of the rim 46 to the cradle. The container is then rigidly attached to the cradle. The crank 117 is then manipulated which causes shaft 34 to rotate and the cradle 11 is moved from the position shown in dotted lines in Fig. 4 to that shown in full lines in Figs. 1, 2, and 3. During such movement the container 41 is moved through the opening in the front and top thereof and into the housing 12. As the container 41 approaches its inverted position the rim 44 of the same engages the cover 26 of the housing 12 and raises the same. When the container 41 is completely received within said housing as shown in Fig. 1, the cover 26 drops down to normal position resting upon the flanges 28. Closure 39 then closes the forward portion of the opening in the housing. To close the portion of the housing 12 forwardly of the cover 26, a plate 29 is employed which is attached to the lower end of the closure 39. This plate fits up against the forward edge of the closure 26 and fits around the container 41. The container 41 is then totally enclosed within the housing 12. With the parts so disposed the door 77 is opened and the handle 67 manipulated to rotate the valve member 63. This causes the material within the container 41 which had flowed into the hood 52 during inversion of the said container to flow through the openings 59 in said hood and into the interior 75 of the hopper 68. Upon the manipulation of the switch 99, the conveyer 81 is operated and the material to be discharged from the container is delivered at the upper end of the tube 82. Adjustment of the nuts 97 and 98 controls the rate of discharge. A spout 131 is connected to the upper end of the said tube and discharges by gravity the material delivered by the conveyer 81 into a receptacle disposed below the same.

The advantages of the invention are manifest. The device is extremely simple in construction and efficient in operation. The dangers encountered in handling hazardous chemicals are largely eliminated and the labor of lifting heavy containers containing such chemicals is minimized.

Changes in the specific form of my invention, as herein described, may be made within the scope of what is claimed without departing from the spirit of my invention.

Having described my invention, what I claim as new and desire to protect by Letters Patent is:

1. In material handling apparatus, a support, a cradle, means on said cradle for securing thereto a container, pivot means between said cradle and support for guiding the cradle for movement to elevate the container, a housing on said support for the reception of said container and having an opening therein, and extending along the front and top of the housing and through which the container may pass, a cover hinged to said housing and normally closing a portion of the opening in the top of the housing, said container upon entering the housing, engaging the cover and raising the same to permit passage into the housing, and a closure on said cradle closing a portion of said opening at the front of the housing when the container is in elevated position.

2. In material handling apparatus a support, a cradle, means on said cradle for securing thereto a container having an opening at the upper portion of the same, a conical hood adapted to overlie said opening and close the same, said hood having an opening therein extending along an element of the same, a valve member pivoted to said hood at the apex thereof and rotatable to cover or uncover said opening, means acting between said cradle and support for raising and inverting said container, and a hopper carried by said support and positioned below said hood when the container is inverted to receive the material discharged therefrom through said opening in the hood.

3. In material handling apparatus, a support, a cradle, means on said cradle for securing thereto a container having an opening at the upper portion of the same, valve means for closing said opening, means acting between said cradle and support for raising and inverting said container and a hopper carried by said support and positioned below said valve means when the container is inverted to receive the material discharged therefrom, and a conveyor connected to said hopper.

4. In material handling apparatus, a support, a cradle, means on said cradle for securing thereto a container having an opening at the upper portion of the same, valve means for closing said opening, means acting between said cradle and support for raising and inverting said container and a hopper carried by said support and positioned below said valve means when the container is inverted to receive the material discharged therefrom, said hopper having an inclined portion and a conveyer extending along said inclined portion.

5. In material handling apparatus, a support, a cradle, means on said cradle for securing thereto a container having an opening at the upper portion of the same, valve means for closing said opening, means acting between said cradle and support for raising and inverting said container and a hopper carried by said support and positioned below said valve means when the container is inverted to receive the material discharged therefrom, said hopper having two converging walls forming an inclined trough therebetween, and a conveyer disposed in and extending along said trough.

CLIFFORD H. ANDERSON.

REFERENCES CITED

The following references are of record in the file of this patent:

UNITED STATES PATENTS

| Number | Name | Date |
| --- | --- | --- |
| 780,938 | Clarke | Jan. 24, 1905 |
| 984,951 | Macon | Feb. 21, 1911 |
| 1,018,862 | Ayres | Feb. 27, 1912 |
| 1,108,944 | Tannenbaum | Sept. 1, 1914 |
| 1,181,350 | Seburn | May 2, 1916 |
| 1,226,588 | Perry | May 15, 1917 |
| 1,305,087 | Galloway | May 27, 1919 |
| 1,822,530 | Kind | Sept. 8, 1931 |
| 1,909,536 | Hoke | May 16, 1933 |
| 2,059,135 | Moe | Oct. 27, 1936 |
| 2,345,074 | Sargent et al. | Mar. 28, 1944 |